March 30, 1965   F. L. MOREHOUSE   3,175,648
BALANCED SOLENOID MAGNET AND BRAKE
Filed Sept. 17, 1962   2 Sheets-Sheet 1
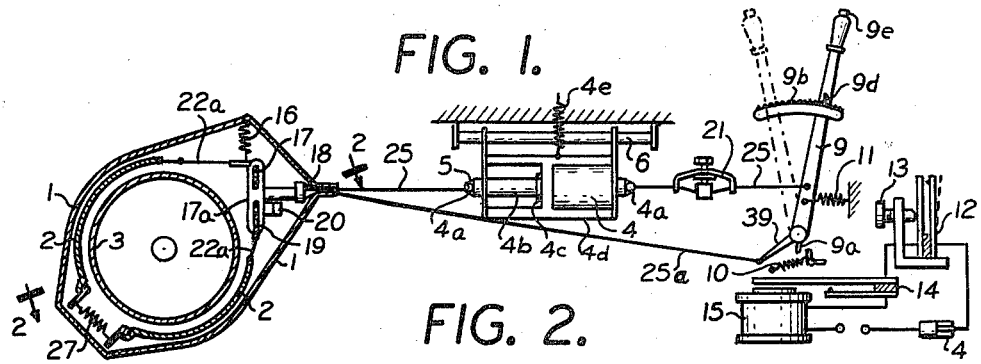
FIG. 1.
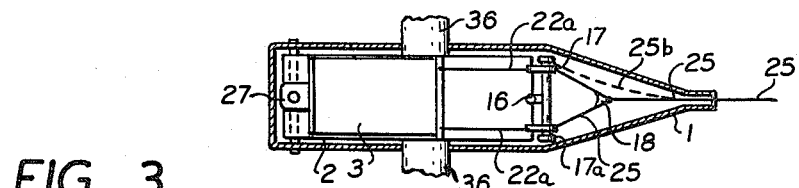
FIG. 2.
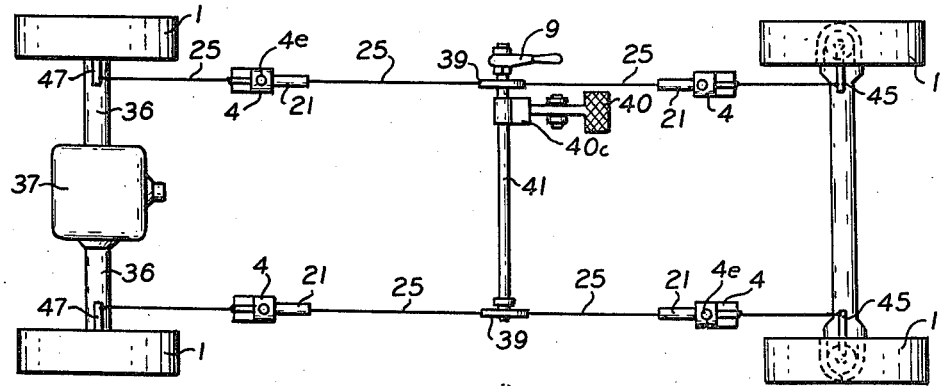
FIG. 3.
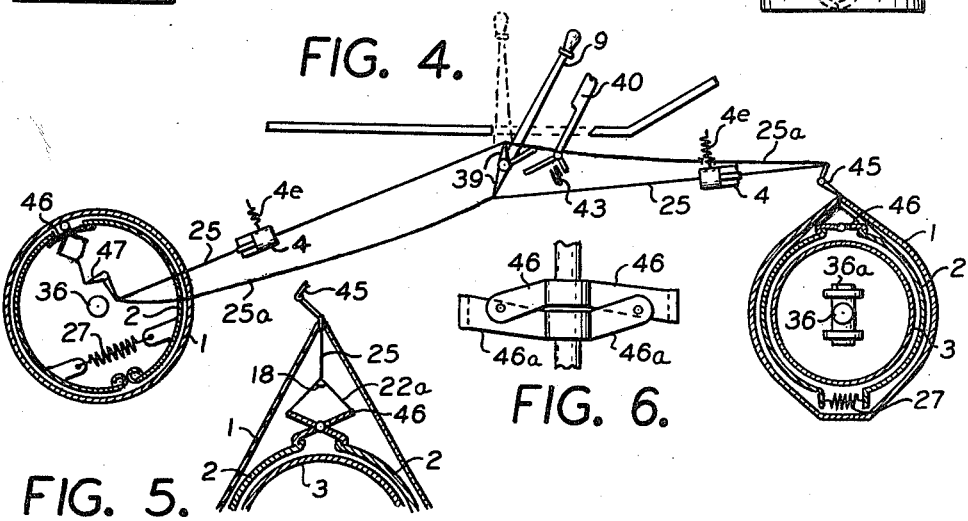
FIG. 4.
FIG. 6.
FIG. 5.

March 30, 1965 F. L. MOREHOUSE 3,175,648
BALANCED SOLENOID MAGNET AND BRAKE
Filed Sept. 17, 1962 2 Sheets-Sheet 2
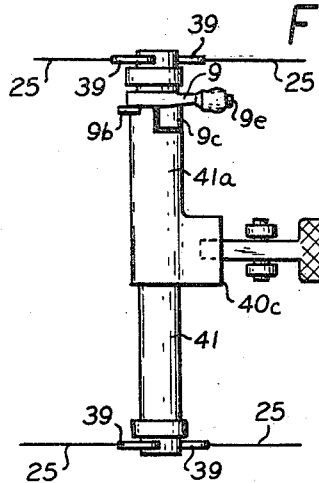
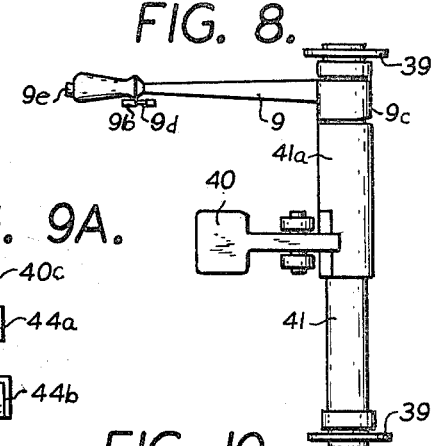
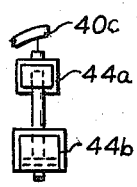
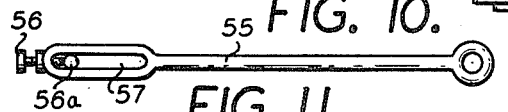
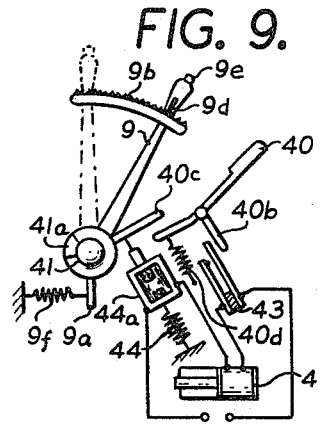
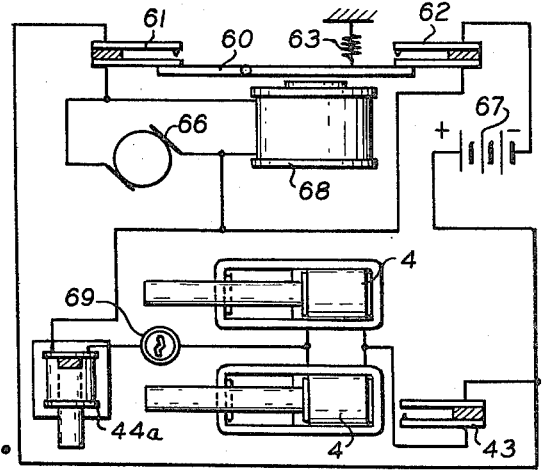
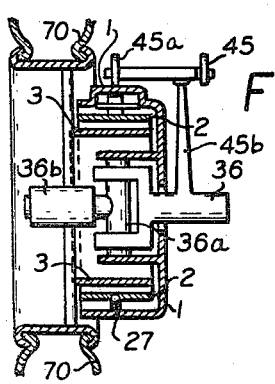
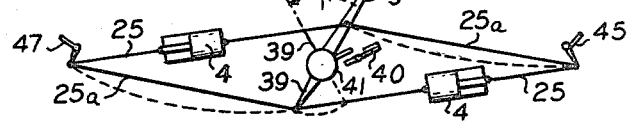
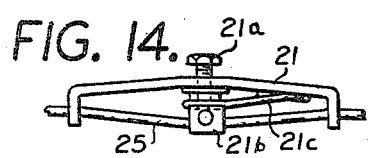

United States Patent Office 3,175,648
Patented Mar. 30, 1965

3,175,648
BALANCED SOLENOID MAGNET AND BRAKE
Frank L. Morehouse, 96 Hawthorne St.,
Brooklyn 25, N.Y.
Filed Sept. 17, 1962, Ser. No. 224,183
6 Claims. (Cl. 188—106)

The invention consists of a new type of balanced solenoid magnet applicable among other things, to a magnetic brake that functions by moving a solenoid magnet or the plunger toward the brake band so the plunger can be drawn into the magnet to develop an increasingly greater power as it moves inward. The magnet is constructed to have a steadily increasing pull. A balancing spring has a slightly greater pull than the solenoid magnet and the increase in pull of the magnet and the pull of the spring is matched. The effect is comparable to an electrical resistance controlled by a movable lever to provide a steadily increasing strength as the controlling lever is moved forward, but there is no wasted heating effect as in using a resistance. This principle can be applied to all solenoid magnets used for any purpose requiring a pulling force. A double magnet such as one for the front wheels and another magnet for the rear wheels of a four wheel automotive car or truck can be used, or one magnet can be provided for each wheel regardless of the number, so that if one of the magnets fails to function the remaining magnets will still be effective.

The advantages of a magnetic brake are that there is no hydraulic fluid with the problem of leakage and the necessity of continual renewal, and providing and maintaining an oil pump is unnecessary, and there is no compressed air supply with its leakage and providing and maintaining an air compressor, or the use of a vacuum system is not required. The electrical supply for a magnetic brake in a motor car can be either the generator of the motor or the storage battery.

The magnetic braking system can be a combination of power and manual operation, so that braking power by a hand lever or by foot pedal is always available for emergency use, or hand power is available for continuous holding power without the continual use of any electrical power, and the hand lever can be drawn back electrically with a light uniform pull. A mechanism is also included where both electrical power and foot power can be used at any time if the electric current should partially fail, such as a run down battery or a partially defective generator.

The mechanism is inexpensive to construct and simple to operate, and provides an adequate amount of braking power under any normal conditions regardless of whether any electrical power is available or not, and the transition from electrical to hand or foot power is automatic.

The preferred embodiment of the invention consists of a four wheel solenoid magnetic brake, with a hand lever for permanently holding the brakes on without the use of continuous electrical energy, but that discontinues the use of the electric current as soon as the brake is set, and an intermittent use of the foot pedal that can be pressed part way down to fully utilize the electric power, with the application of the full electric power requiring very little foot pressure, and a continued pressure on the foot pedal will supplement the electrical energy if desired.

The basic principle of the magnetic brake is that the extent of the movement in slackening the flexible connector to permit the plunger to be drawn into the magnet, is that the plunger is pulled a greater distance than the flexible connection is shortened, so that the overall distance is less, and the brake shoes can be pulled into contact with the brake band by shortening the length of the flexible connector. Both movements can be small as it is necessary to pull the brake shoes only a short distance, and the hand lever and foot pedal can provide leverage by moving a greater distance.

This invention is based on the principle that a solenoid magnet can be constructed so the pull on the plunger is progressively increased as the plunger moves into the solenoid magnet, so that controlling the distance the plunger can move into the solenoid magnet controls the power of the brake. The result is the reverse of the usual situation where pulling a flexible connector is required to communicate a pull to an object such as a brake, whereas, slackening the flexible connector causes the solenoid to give a stronger pull. By connecting two sets of flexible connectors to a double opposing lever, the solenoid can exert a pull equal to about one half the distance travelled by the operating lever, the further movement of the lever in the same direction will bring the loose flexible connectors on the opposite lever into action to apply an additional manual braking force, as the flexible connector attached to the solenoid plunger will merely slacken for the additional distance that gives the added manual pull. For all usual usages the pull of the solenoid should be sufficient for ordinary braking, and the manual braking would only be used if the solenoid braking fails. The flexible connectors to the plunger are tight at the beginning of the action and then loosen, while the flexible connectors opposite are loose at the beginning of the action and tighten as the flexible connectors to the plunger loosen or go backward toward the brake drum, so that both functions operate by moving the controlling lever in the same direction. Moving the solenoid frame toward the brake band about one inch can result in drawing in the plunger about two inches which results in shortening the flexible connector about one inch which pulls on the brake.

The holding brake can be activated by a magnetic switch operated by the hand lever that utilizes the solenoid magnet to pull the brakes on with full force and then holds them on by a catch on a ratchet, with a time switch that promptly disconnects the magnetic switch so as to use very little electric current in pulling the brake on, and no current in holding it on, as the catch does the holding. The releasing button for the catch is pushed to let a spring return the brake lever to the off position.

The action of the solenoid magnet is a reverse action, as lengthening a connecting member exerts a shortening effect. This makes possible combining a power and a manual brake, both of which can operate by a movement in the same direction. All features of the mechanism are self adjusting or they are not highly critical.

The drawings comprise;

FIG. 1, side view of a single solenoid magnet hand operated electric brake.

FIG. 2, view through section 2—2 of FIG. 1.

FIG. 3, top view of four wheel and four solenoid magnet brake.

FIG. 4, side view of FIG. 3.

FIG. 5, detail of front wheel brake shoe mechanism.

FIG. 6, top view of double levers.

FIG. 7, top view of hand lever and brake pedal.

FIG. 8, front view of FIG. 7.

FIG. 9, side view of FIG. 7.

FIG. 9A, compressed air balancing mechanism.

FIG. 10, detail of rigid connector.

FIG. 11, wiring diagram of two solenoid magnetic brake.

FIG. 12, sectional view of steerable wheel mechanism.

FIG. 13, schematic diagram of electric and supplementary foot and hand power brake.

FIG. 14, side view of adjusting device for flexible connector.

FIG. 15, end view of FIG. 14.

The solenoid magnet 4 in FIG. 1, is attached to an enclosing frame 4d that has a holding ring 4a for a rear flexible connector 25. The two brake shoes 2 are movable attached to the enclosing frame 1 of the brake band assembly. A spring 27 holds the two shoes 2 away from the branke band 3. A joining piece 18 connects the single flexible connector 25 with the two brake shoe flexible connectors 22a, one of which is attached to a pivoted right angle lever 17 for the rear brake shoe 2, and the other to a straight lever 19 for the forward brake shoe 2. Two springs 16 and 20 hold the two levers 17 and 19 in the outward position so the movable ends of the brake shoes 2 are held away from the brake band 3. The hand lever 9 has a ratchet 9b with a catch 9d that automatically holds the lever 9 in the position it is pulled into. Flexible connector 25a attached to projection 39 on the hand lever 9 holds the brake on when the electric current is discontinued. A push button 9e on the top of the lever 9 releases the catch 9d from the ratched 9b and balancing spring 11 returns the hand lever 9 to the neutral or off position. A pull on the flexible connector 25 when the hand lever 9 is pulled back from the neutral or off position, moves the rear brake shoe 2 attached to the upper pivoted right angle lever 17 closer to the brake band 3, and the lower pivoted straight lever 19 moves the forward brake shoe 2 closer to the brake band 3, and the flexible connectors 25 also pulls forward the joining piece 18 for the two flexible connectors 25 to make the brake shoes 2 grip the brake bands 3. Two side pieces 17a join the right angle lever 17 and the straight lever 19. As the hand lever 9 is moved rearward, the stronger the plunger 4b is pulled into the solenoid magnet 4 when the electric current is on, and the greater the braking effect. The plunger 4b automatically stops when the brake shoes 2 cannot be pulled any tighter, and has a collar 4c to hold the plunger in. The balancing spring 11 has a slight pull to hold the hand lever 9 in the off position, and the strength of the balancing spring 11 increases in unison with the increase in strength of the solenoid magnet 4 as the plunger 4b moves inward, so the hand energy required is slight and constant as the hand lever 9 moves rearward or to the on position, and only a slight pressure can give the full power of the magnetic pull. An adjustable heat operated bi-metal time switch 12 disconnects the current, and is adjusted by the set screw 13. Releasing the push button 9e at the top of the hand lever 9 releases the catch 9d and lets the balancing spring 11 pull the hand lever 9 to the off position. Lever 9 and a small angle lever and spring 10 closes switch 14 as the projection 9a moves forward but is ineffective on the return. The rearward movement of the lever 9 shortens the flexible connector 25 which allows the solenoid magnet 4 to move rearward, that is toward the left in the drawing, and to pull in the plunger 4b with increasing strength. The movement of the plunger 4b inward or forward, must be greater than the distance of the rearward movement of the solenoid magnet 4 so that the flexible connector 25 actually becomes shorter as the action increases, to pull the brake band 3 tighter and create the braking effect. None of these motions are very great. The effect of a small net shortening of the flexible connector 25 can be increased by a lever action if desired. The pull on the brake band 3 and on the balancing spring 11 are always the same. The projection 9a on the lever 9 only connects the lever 10 momentarily as projection 9a passes over at the beginning of the movement of lever 9, but the magnet 15 continues to hold switch 14 connected so the lever 9 can be pulled fully back until the timer 12 brakes the circuit in a few seconds by heating. The magnet 15 then disconnects switch 14, and timer 12 reconnects by cooling ready for the next cycle. The solenoids 4 are momentarily activated to pull the brakes on so the hand lever 9 can be pulled on as far as desired with very little manual effort. The solenoid magnet 4 can slide on the runs 6 if desired, or it can function in mid-air. The pigtail 4e connects magnet 4, which has an enclosing frame 4d.

FIG. 2 is a section through 2—2 of FIG. 1. The joining piece 18 is V shape to provide for attaching flexible connectors 25 to each side of the brake shoe 2. The enclosing frame 1 has a tube where the flexible connector 25 enters to keep out the dust. The dotted line 25b shows how the V shape connector 18 will automatically move to one side to shorten a connector 25 if it is longer than the other connector. The spring 16 and the two flexible connectors 22a, the upper right angle lever 17, the two side joining pieces 17a for levers 17 and 19 and the axle 36 are indicated. The wiring circuit is also shown in FIG. 1.

There are four solenoid magnets 4 operated from a shaft 41 in FIGS. 3, 4 and 5. The foot pedal 40, and the hand lever 9 operate from shaft 41, and the electric switch 43 shown in FIG. 9 operates from foot pedal 40, and switch 14 in FIG. 1 operated by the hand lever 9, activates the magnets 4. There are double lever arms 39 on the shaft 41 for the flexible connectors 25. The brake shoes 2 are symmetrically arranged with the two pivoted ends at the bottom, and have a separating spring 27 to hold the brake shoes apart. The two brakes on the two front wheels provide for the required movement for steering by having the flexible connectors 25 enter the enclosing frame 1 from the top of the center of the turning motion, so the length of the flexible connectors 25 will not change with the steering movement. The flexible connectors 25 attached to the solenoid magnets 4 are for electrical operation, and the opposite flexible connectors 25a without magnets, are for hand operation. The connectors 25 with magnets 4, move toward the brake band 3 to shorten the distance so the magnets 4 can draw the solenoid plunger 4b inward to exert an increasing pull on the connectors 25. The connectors 25a without magnets, pull in the opposite direction to tighten the brake shoes 2. The front brake has the brake shoes 2 outside the brake band 3 to permit the flexible connectors 25 to enter the top of the enclosing frame 1. The magnet 4 pulls the connectors 25 rearward which exerts a pull upward through the lever 45 and the connectors 25 then splits into two connectors, one for each of the levers 46, and gives a downward pressure and a pinching together effect on the two shoes 2. The upper lever shaft 45 is attached by an arm 45b in FIG. 12, to the fixed axle 36 so it will not move with the wheel. The rear brake has inside shoes 2 with connector 25 attached to the lever 47 on the fixed axle that works on the same principle as the front outside shoes 2, but the movement is an outward and spreading apart motion. The steering knuckle 36a at the front, the differential gears 37 at the rear and the pig tail electric supply cords 4e for the solenoid magnets 4 are indicated. The double flexible connectors 25 from the V shape connector 18 to the brake shoes 2 are self adjusting as described in FIG. 2.

The double levers 46 and 46a in FIG. 6 operate the brake shoes 2 on the outside of the brake band 3, and the double levers that operate the brake shoes 2 on the inside of the brake band 3 are similar. Their object is to have the flexible connectors 25 attached to the center of levers 46, and to have the other projection of levers 46a engage the brake shoes 2 on the center line to maintain a proper balance. Inside or outside brake shoes can be installed on front or rear wheels by the use of the extension arm 45b in FIG. 12.

The mechanism assembly in FIGS. 7, 8, 9 and 9A shows the brake pedal 40 loosely movable on its shaft, the switch 43 that a slight movement of the projection 40b of the brake pedal 40 activates, and the spring 40d that pulls the pedal 40 upright when released. The projection 9c on the hand lever 9 engages and turns the sleeve 41a attached to the shaft 41, and the foot pedal 40 engages and turns the projection 40c on the sleeve 41a of the shaft 41. The balancing spring 44 that increases in strength in unison with the increasing strength of the pull of the solenoid plunger 4b as it moves inward, is too strong to be connected to the sleeve 41a on shaft 41 when the brake is used non-electrically, so a solenoid magnet 44a with a plug in the closed end is used to hold the plunger of magnet 44a in firmly to give the spring 44 a strong tension. Magnet 44a is in the circuit of switch 43, but only releases spring 44 for use without electric current. When the electric current ceases the plunger of magnet 44a moves outward and the spring 44 has only a slight effective pull. Spring 9f returns the hand lever 9. A compressed air cylinder can also be used instead of spring 11 in FIG. 1, and spring 9f in FIG. 9, to counter balance the pull of the solenoid magnet 4 on hand lever 9. The piston of a compressed air cylinder 44b with one end open can be attached to the solenoid magnet 44a instead of a spring.

The rigid connection 55 in FIG. 10 can be used as a substitute for the flexible connectors 25 and 25a, the slot 57 at the end making it possible to shorten and lengthen the distance between the two connections by the motion of a sliding adjustable member 56a in the slot. An adjustment screw 56 with a lock washer and nut to hold the screw tight, can be used as a means of adjusting the usable length of the rigid connectors 55.

The wiring diagram in FIG. 11 has a circuit for operating by the battery 67, and a separate circuit for operating by the generator 66 operated by a double magnetic switch arm 60 and switches 61 and 62. When the generator 66 is running, the magnet 68 draws the switch arm 60 down, which closes the switch 61 and sends the current to the solenoid brake magnets 4 when the pedal switch 43 is operated. When the generator 66 is not running the switch arm 60 is pulled upward by the spring 63 and closes the battery switch 62 so that when the pedal switch 43 is connected the current operates the brake solenoid magnets 4. The solenoid magnet 44a for the balancing spring 44 and the solenoid brake magnets 4 are in both circuits. The electric current for the electrical brake mechanism can be turned on and off by the ignition key 69 if desired.

The front brake assembly in FIG. 12 shows the main axle 36 and the steering knuckle 36a and the wheel axle 36b. The brake band 3 is attached to the wheel 36b on which a tire 70 is indicated. The operating lever is mounted on an arm 45b attached to the fixed axle 36 and the lever 45a is over the center of the movement of the front wheel, and a flexible connector 25 passes through the short tube in the exterior frame 1 of the brake assembly, and is attached to the mechanism to operate the brake. The brake frame 1 is attached to the steering knuckle 36a and turns with the wheel but does not rotate. The brake shoes 2, and the brake shoe spring 27 are also indicated.

In FIG. 13 when the brake pedal 40 is applied, the application of electric power takes place with steadily increasing strength until the pedal moves to the mid point of the movable range of the center lever arms 39, where the electric power is applied full strength. The flexible connectors 25 of the electric control system will continue to slacken as the brake pedal 40 is pushed beyond the mid point, but the plunger 4b will be fully within the magnet 4 or as far as the plunger 4b can go, and the flexible connectors will hang loosely without any further effect. A set of flexible connectors 25a for the direct non-electric foot pedal operation of the brake are connected to the opposite side of lever arms 39 which were previously slack, but become tight as the mid point is reached, and as much additional brake power can be brought into use as the operator can give by foot pressure on the pedal 40 to supplement the electric brake if the current is weak or if there is no electric current, so the full power of foot pressure will be available for use automatically at any time in the movement of the brake pedal 40 through the second part of the downward movement, and this braking power can also be supplemented if desired, by pulling on the hand brake lever 9. In ordinary usage the hand lever does not move with the foot pedal, or the foot pedal with the hand lever.

The device in FIGS. 14 and 15 is a means of adjusting the flexible connectors 25 to the right length so there will be no unnecessary play in drawing the connectors tight. The flexible connectors 25 pass through the holes in the two end pieces of the frame 21 and through a hole in a center piece 21b attached to the frame 21 by a flexible strip 21c. A set screw 21a through the frame 21 contacts the center piece 21b and forces it downward sufficiently to take up the unnecessary slack in the flexible connector 25. A nut and lock washer hold the screw 21a tight. These flexible connectors 25 can be a small chain, a flexible non-stretchable synthetic braided material of the necessary size to have the required strength and durability, or other suitable material.

Many combinations of this spring balanced solenoid magnet and of this brake are possible, including both hand power and foot power that are operable by a hand lever and a foot pedal with one solenoid magnet operating four or more sets of brake shoes, or with two or more solenoid magnets operating one set of brake shoes, and the brakes are suitable for a wide variety of purposes in any mechanism where a brake is required, and also in opening and closing a lever type of valve. It is also obvious that only one flexible connector can be used. It is not the intention of this specification to limit their use to the few purposes described, as the specification is only intended as illustrative of the principle involved in the operation of this new type of movable solenoid magnet and balancing spring combination.

The invention claimed is:

1. A magnetic brake consisting of the combination of a movable solenoid magnet with the enclosing frame of the magnet flexibly connected to a hand lever and the plunger of the magnet flexibly connected to a brake shoe, a magnetic switch to activate the solenoid magnet that is closed by a projection on the hand lever, an adjustable electric timer to disconnect the electric current a definite time after said magnetic switch has been activated, V shape connector secured to said brake shoe and flexible connector between said plunger and shoe to give an equal pull on the brake shoe, a balancing spring connected to the hand lever that increases in strength in unison with the increasing pull of the plunger of the solenoid magnet when the electric current is on with the balancing spring slightly stronger than the solenoid magnet to return the hand lever to the off position when the hand pressure is removed, and an adjustable device on a flexible connector to accurately adjust the length.

2. A magnetic brake consisting of the combination of a hand lever and a foot pedal engaging a sleeve mounted on a shaft, a movable solenoid magnet with the enclosing frame of the magnet connected to an arm on the shaft and the plunger of the solenoid magnet connected to a shoe of said brake, a balancing means connected to a projection on the sleeve of the shaft that increases in strength in unison with the increasing pull of the plunger of the solenoid magnet when the electric current is on with the balancing means slightly stronger than the solenoid magnet to return the hand lever and foot pedal to the off position when the hand and foot pressure is removed, a lever arm on the shaft flexibly and loosely connected to the brake shoe to pull the brakes on by hand, foot power, or both, when there is no electric current, a projection on the hand lever and a projection on the foot pedal that closes switches to activate the solenoid magnets, a solenoid magnet with a plug in its closed end connected between said sleeve projection and said balancing means to give a strong pull to hold the balancing means tight when the brake is operated by electric current but loosens the balancing means to release the pull when there is no electric current and the brakes are operated only by hand, foot power, or both, an electric circuit with a double magnetic switch to automatically change the source of electrical supply for the solenoid magnets from a battery of a vehicle carrying said brake to the vehicle generator when the generator is operating and from the generator to the battery when the generator is not operating.

3. A magnetic brake as described in claim 2 wherein the balancing means is a compressed air cylinder.

4. A magnetic brake as described in claim 2 wherein a spring is the balancing means of the solenoid magnet.

5. A magnetic brake as described in claim 2 wherein a flexible means connects the enclosed frame of the solenoid magnet to the lever arm of the sleeve.

6. A magnetic brake as described in claim 2 wherein an adjustable rigid means connects the enclosing frame of the solenoid magnet to the lever arm of the sleeve.

References Cited by the Examiner
UNITED STATES PATENTS

| | | |
|---|---|---|
| 1,309,377 | 7/19 | Upperhill. |
| 1,426,543 | 8/22 | Bonner. |
| 1,497,127 | 6/24 | White. |
| 1,815,157 | 7/31 | Loughead. |
| 1,893,833 | 1/33 | Apple. |
| 2,249,220 | 7/41 | McCann _____ 188—106 X |

ARTHUR L. LA POINT, *Primary Examiner.*

EUGENE G. BOTZ, *Examiner.*